No. 704,929. Patented July 15, 1902.
H. A. ROWLAND, Dec'd.
H. H. ROWLAND, Administratrix.
MEANS FOR PRODUCING AND MAINTAINING SYNCHRONOUS MOTION.
(Application filed Dec. 11, 1901.)
(No Model.) 2 Sheets—Sheet 1.
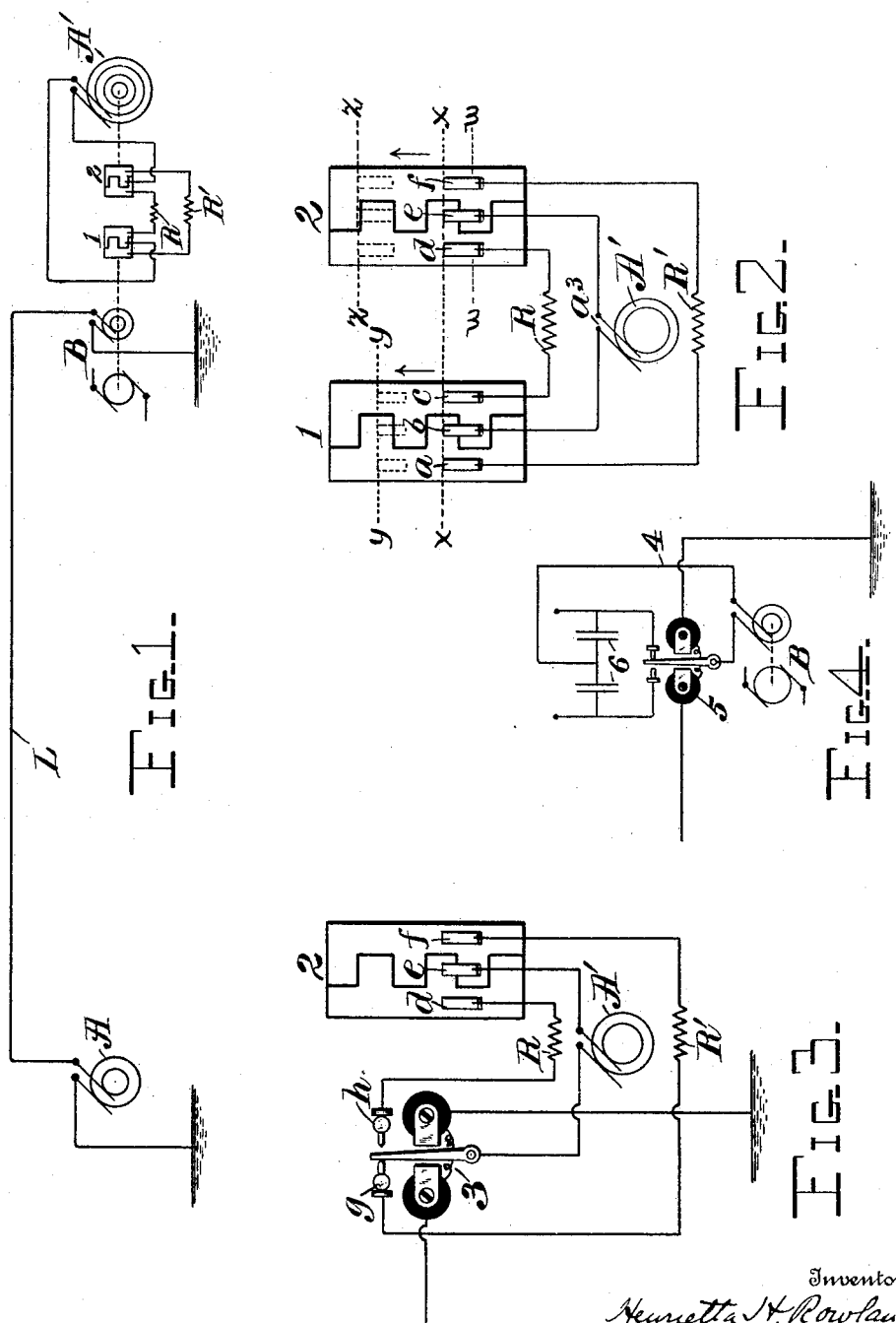

No. 704,929. Patented July 15, 1902.
H. A. ROWLAND, Dec'd.
H. H. ROWLAND, Administratrix.
MEANS FOR PRODUCING AND MAINTAINING SYNCHRONOUS MOTION.
(Application filed Dec. 11, 1901.)
(No Model.) 2 Sheets—Sheet 2.
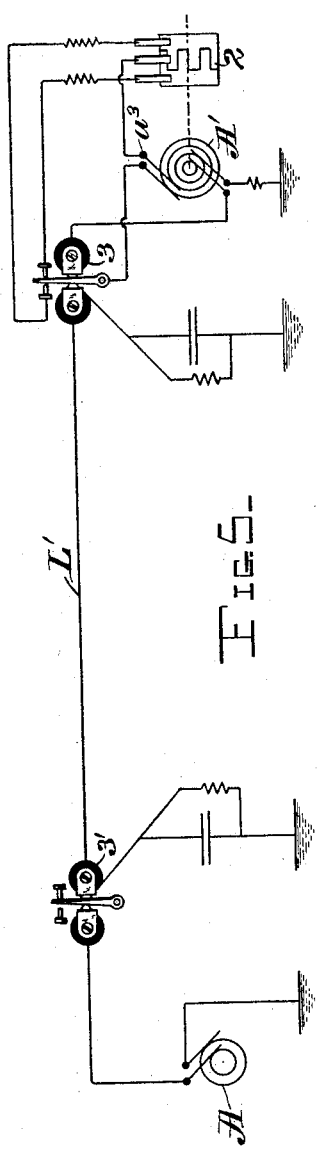
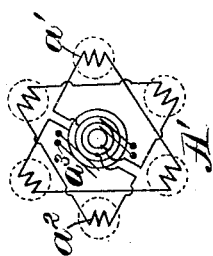
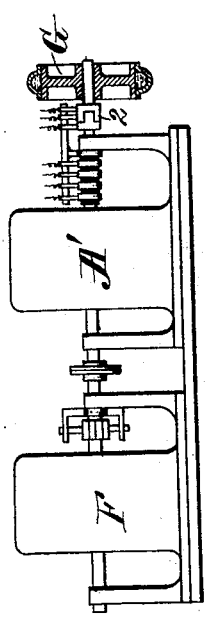

UNITED STATES PATENT OFFICE.

HENRIETTA H. ROWLAND, OF BALTIMORE, MARYLAND, ADMINISTRATRIX OF HENRY AUGUSTUS ROWLAND, DECEASED, ASSIGNOR TO ROWLAND TELEGRAPHIC COMPANY, OF BALTIMORE, MARYLAND, A CORPORATION OF NEW JERSEY.

MEANS FOR PRODUCING AND MAINTAINING SYNCHRONOUS MOTION.

SPECIFICATION forming part of Letters Patent No. 704,929, dated July 15, 1902.

Original application filed July 24, 1901, Serial No. 69,524. Divided and this application filed December 11, 1901. Serial No. 85,519. (No model.)

*To all whom it may concern:*

Be it known that HENRY A. ROWLAND, deceased, late a citizen of the United States, and a resident of Baltimore city, in the State of Maryland, did invent certain new and useful Improvements in Means for Producing and Maintaining Synchronous Motion, (Case J²,) of which the following is a full, clear, and exact description, such as will enable any one skilled in the art to which it appertains to make and use the same.

This invention relates to improvements in means for producing and maintaining synchronous motion between two or more rotating or vibrating bodies.

Considered more specifically, the said invention relates to improved means for synchronizing dynamo-electric machines or electric motors for telegraphic or any other purposes for which they may be used.

The object of the said invention is the production and maintenance of synchronous motion in its broadest sense, and when applied to dynamo-electric machines or motors it may be for the purpose of producing and maintaining synchronism as between two or more machines or it may be for the purpose of producing and maintaining synchronism between one machine and any other rotating or vibrating body.

The invention consists generally in providing means whereby any change of the phase relations between the dynamo or other body to be synchronized and the dynamo or other body with which synchronism is to be maintained results in a change in the amount of energy absorbed by the dynamo or other body to be synchronized and a consequent maintenance of synchronism.

More especially, the said invention consists in exerting upon the dynamo or other body to be synchronized, said dynamo or other body having a constant tendency to accelerate its speed with relation to the body with which synchronism is to be maintained, a force acting to counteract this acceleration, the said force being in the form of a load arising from the consumption of electrical energy or work done by the said body to be synchronized, this load being thrown upon the said dynamo or other body at rapidly-recurring intervals, the duration of each interval varying as the phase between the body to be synchronized and the body with which synchronism is to be maintained varies.

The invention further consists in establishing between the bodies to be synchronized two extreme phase relations, one of which results in a maximum load on the body to be synchronized and the other in a minimum load upon said body and varying this load as the indefinite number of phase relations between the two extremes vary, thereby imparting to the said body to be synchronized a different speed for each different phase relation.

Synchronism according to this invention does not depend upon any quality of the regulating means to tend to vibrate at a predetermined rate independent of the driving power of either the body to be synchronized or the body with which synchronism is to be maintained, as in the cases of the well-known tuning-fork methods; but in contradistinction to those methods the said invention employs regulating devices, such as circuit-changers, which are entirely dependent for their movement, respectively, upon the body to be synchronized and the body with which synchronism is to be produced or maintained. Moreover, this invention does not depend for its regulation upon any reversals of the field magnetism of the dynamo or motor or upon a reversal in the armature-current, but upon the integral effect of rapidly-recurring loads, which are thrown upon the dynamo or other body to counteract its acceleration.

This invention furthermore relates to certain improvements originally shown and described in the patent application of Henrietta H. Rowland, administratrix of the estate of Henry A. Rowland, deceased, for improvements in telegraphic distribution, filed July 24, 1901, and serially numbered 69,524, of which the present application is a division.

In order to more fully describe the said invention, reference will be had to the accompanying drawings, in which—

Figure 1 is a diagram illustrating the principle of the invention and showing its application to the synchronism of dynamos located at a distance from each other. Fig. 2 is a diagram showing the circuit-changers of Fig. 1 enlarged and developed. Fig. 3 is a diagram showing the substitution of a relay for one of the rotating circuit-changers. Fig. 4 is a diagram showing an alternative way of connecting a synchronizer. Fig. 5 is a diagram showing the application of the invention to the synchronizing of dynamos located at the ends of a duplex telegraph-line. Fig. 6 is a side elevation, partly in section, of a dynamo to be synchronized, shown coupled to its driving-motor; and Fig. 7 is a diagram of the armature connections of the said dynamo.

Similar letters and numerals refer to similar parts throughout the several views.

In the specific application of the invention shown in Fig. 1, A represents an alternating-current dynamo or other rotating or vibrating body with which synchronism is to be maintained, and A' a dynamo to be synchronized. L represents a line carrying the regulating-current, which in the case shown is delivered to said line by the dynamo A. This regulating-current, however, may be derived from any source so long as it has a periodic variation and this variation bears a fixed relation to the body with which synchronism is to be maintained.

The dynamo A' may be of any of the well-known commercial types, but is provided with an extra set of armature-regulating or synchronizing coils $a'$ in addition to the regular coils $a^2$ for generating current for other purposes. In case the invention is applied to the synchronism of electric motors the coils $a'$ would simply be added to the armature of the motor. The number and proportion of these coils may of course be varied to suit special cases.

1 and 2 represent rotating circuit-changers, consisting each of two interlocking crown-sections and each provided with a series of brushes, the circuit-changers 1 with the brushes $a\ b\ c$ and the circuit-changer 2 with the brushes $d\ e\ f$. The brushes $a\ c$ and $d\ f$ are the ring-brushes and remain constantly in contact with the same section, while the intermediate brushes $b\ e$ pass first from one section to the next as the circuit-changers rotate. The brushes $a f$ are electrically connected through a resistance R' and the brushes $c$ and $d$ are connected through a resistance R. These resistances R and R' may be combined with self-induction or capacity, if desired, and by this the character of the regulation altered. The brushes $b$ and $e$ are connected, respectively, to the terminals of the armature-regulating coils of the dynamo A'.

The circuit-changer 1 is driven in synchronism with the dynamo A in any suitable manner, one way being that shown in Fig. 1, which consists in mounting the circuit-changer 1 upon the shaft of or otherwise gearing it to a small synchronizer B—such, for example, as shown and described in Letters Patent No. 622,636, granted to Henry A. Rowland, April 4, 1899, the said synchronizer being governed by current in the regulating-circuit L.

The circuit-changer 2 is mounted on the armature-shaft of, or is driven in any other suitable manner in synchronism with the dynamo A' and preferably at such a speed that the brush $e$ passes over one segment of the circuit-changer for each semicycle developed by the said dynamo.

The electric motor or other device for driving the dynamo A' is set or regulated in such manner that the said dynamo will, when the synchronizing apparatus is not in use, run faster than the dynamo A, or, more generally, the device to be synchronized normally has a tendency to run faster than the device with which synchronism is to be established, but is opposed by the action of the synchronizing apparatus.

Since the operation of the regulating apparatus above described consists generally in regulating the speed of the dynamo or the other body A' by varying its load as the said dynamo A varies its speed as the voltage-supplying power to dynamo A' is varied or as the outside load is changed, the regulating apparatus must be capable of throwing on the dynamo or the other body A' loads of varied degrees which shall have certain values and which shall depend upon the speed of the dynamo A, the voltage-supplying power to dynamo A', and the load on the dynamo A', due to causes aside from the effect of the synchronizing device. If the speed of the dynamo A should be high, the load thrown upon the dynamo A' must be correspondingly light. If this speed is slow, the load must be correspondingly heavy. If the voltage-supplying power to dynamo A' is low, the load must be correspondingly light to compensate for low voltage, and if this voltage is high the load must be correspondingly heavy. Further, if, due to any change of friction or any other cause, a heavier or lighter load is thrown on the driving power of dynamo A' this must be compensated for by a corresponding change in the load produced by the synchronizing device. There are therefore two extreme conditions—one of maximum speed and minimum load and the other of minimum speed and maximum load—and between the two an infinite number of conditions of speed and load. For each of these extreme conditions there is a definite phase relation between the bodies between which synchronism is to be maintained, and therefore between the brushes of the respective circuit-changers, and as many different phase relations between the two extremes as there are different speeds between the two bodies. Thus let it be assumed that at a given instant the brushes of the circuit-changers lie upon the line $x\,x$, Fig. 2. If then we attempt to trace the circuit from one of the dynamo-brushes $a^3$ to the other, it will be seen that the circuit is not complete, as the brushes $e$ and $f$ lie at that instant upon separate sections of the circuit-changer 2. Likewise when the circuit-changers advance in the direction of the arrows, Fig. 2, until the brushes $b$ and $e$ come in contact with the next segments the circuit from the dynamo-brushes $a^3$ will be broken across the brushes $a$ and $b$. Therefore as long as the circuit-changer brushes maintain this phase relation no extra retarding effect will be exerted upon the dynamo $A'$, as by connecting into its armature-circuit the resistances (or other electrical constants) $R$ and $R'$, or it may be stated generally that so long as the brush $b$ arrives upon any given point of one of the segments of the left-hand section of its circuit-changer at the same time that the brush $e$ arrives upon a corresponding point of one of the segments of the left-hand section of its circuit-changers and so long as the phase relation above set forth between the brushes $b$ and $e$ exists while they are also passing over the right-hand sections of the respective circuit-changers, no retarding effect or extra load will be placed upon the dynamo $A'$ or other body to be synchronized. This is the phase relation of minimum load. In other words, this is one of the extreme conditions under which the dynamo $A'$ may run in synchronism. The other extreme condition or phase relation of maximum load exists when the relations between the brushes of the respective circuit-changers is such that as the brush $b$ arrives upon a given point of a segment of the left-hand section of its circuit-changer the brush $e$ arrives upon a corresponding point of a segment of the right-hand section of its circuit-changer and when they also arrive upon corresponding points of their respective right and left hand sections—as, for example, when the brushes $a\,b\,c$ are upon the line $x\,x$ and the brushes $d\,e\,f$ are upon the line $w\,w$. It will be observed that as long as this phase relation is maintained the resistances (or other electrical constants) $R$ and $R'$ will be connected in the armature-circuit. Let it next be assumed that the phase relation that the brushes of the circuit-changer 1 bear to those of the circuit-changer 2 is the intermediate relation between the two extremes above considered, or, in other words, let us assume that the circuit-changer 2 has advanced with respect to the circuit-changer 1 until the brushes occupy the positions in which they are indicated by dotted lines, Fig. 2. In this intermediate position of the brushes the load is thrown on the dynamo periodically, the duration of such period being half that of either of the extreme cases above set forth, or, in other words, for half the time the brushes are passing over the successive segments instead of all the time.

If the displacement of the brushes is equal to one twenty-fourth of a revolution, or, more generally, to one-quarter of a segment, then the duration of the rapidly-recurring intervals for which the load is thrown upon the dynamo is correspondingly diminished. Therefore between the two extreme relations of the brushes set forth there are an infinite number of phase relations, for each of which the integral effect of the load periodically thrown on and off, as before mentioned, is to reduce the speed of the dynamo by an amount depending upon the integral value of this load, so that the circuit-changer 2 may have a different speed for each of the phase relations of the circuit-changer brushes and a state of synchronism. The retarding effect is therefore a function of the difference in phase between the circuit-changers, and hence between the dynamos or other devices to be synchronized, this function being dependent upon the electrical constants of the local regulating-circuit or in the case shown the circuit of the dynamo regulating-coils. If this circuit consists only of resistance and has no self-induction or capacity immediately upon its being closed, the current therein attains its full value and so remains while the circuit remains completed, and in this case load thrown upon the dynamo will be directly proportional to the phase difference between the circuit-changer brushes; but if this circuit contains self-induction or capacity the form of this relation will be somewhat altered.

For the purpose of illustration let it be assumed that in the case of the first extreme condition—viz., that of no load upon the dynamo—its speed is fifteen hundred revolutions per minute, that for the condition of constant load or the other extreme condition assumed in the foregoing description the speed of the dynamo is one thousand revolutions per minute, and that a state of synchronism exists when the load is on the dynamo half the time and off half the time or the intermediate condition above assumed, and that the speed of the dynamo for this condition is twelve hundred and fifty revolutions per minute. Then if circuit-changer 2 accelerates its speed relation to circuit-changer 1 the relative phase of the brushes $b$ and $e$ will be momentarily changed in such a manner, as will be readily seen from the foregoing description and Fig. 2, that the duration of the intervals for which a load is on the dynamo will be increased, and as a consequence the circuit-changer 2 will lessen its speed and in its turn will diminish the duration of the above-mentioned interval, and a state of equilibrium is attained when the phase relation between the brushes $b$ and $e$ is that which corresponds to a speed equal to the speed of circuit-changer 1 at that time.

For illustrating the principle of the invention it has been assumed that the circuit-changers were both of the form shown in Figs. 1 and 2; but the invention is by no means confined to this specific arrangement. In Fig. 3 is shown a case in which the circuit-changer 1 is replaced by a relay 3, which is operated by current from the dynamo A or other source. This relay is represented as being a polar relay; but in some cases it may be replaced by a neutral relay, if desired. The relay 3 is the electrical equivalent of the circuit-changer 1 and its three brushes, the tongue of the relay being equivalent to the brush $b$ and the contacts $g$ and $h$ the equivalents of the brushes $a\ d$. As the relay 3 is operated by the current from the dynamo A, the vibration of its tongue between its contacts will have the same periodicity as the current from the said dynamo, and hence the relay-tongue will pass from one contact to the other as the brush $e$ passes over the insulation between two consecutive segments and remains against its respective contacts as the said brush passes over first one segment of the right-hand section and then a segment of the left-hand section of its circuit-changer. The regulating effect of this arrangement is just the same as in the case of the arrangement shown in Figs. 1 and 2; in this latter case the regulation depending upon the difference in the phase of vibration of the relay 3 and the angular phase of the circuit-changer 2.

It will be seen that in the event that relay 3 is employed in the place of the circuit-changer 1 there is no necessity for employing a rotating device such as the synchronizer B to maintain the circuit-changer in synchronism with the dynamo A. There are, however, several advantages in using the synchronizer and circuit-changer 1 instead of the relay, especially if the dynamo A' is large. The relay-tongue is more sensitive to the variations in the current than the synchronizer and has less inertia than has the synchronizer to keep it going, notwithstanding momentary interruptions in the current. Moreover, the action of the rotating circuit-changer is more positive and easy of adjustment than that of the relay.

If desired, the rotating circuit-changer 2 may also be replaced by a relay. Moreover, these circuit-changers may be replaced by any suitable devices which will accomplish the same end.

Instead of operating the synchronizer upon the main line direct, as shown in Fig. 1, it may be operated upon a relayed circuit, as shown in Fig. 4, the periodically-varying current in the circuit 4 for synchronism being produced by the alternate charging and discharging of the condensers 6, connected across the terminals of a source of constant-potential current acting through the vibrating tongue of the relay S. This is simply an alternative arrangement for connecting a synchronizer and forms no immediate part of the present invention.

A special application of the present invention arises in a case where it is necessary to operate two alternating-current dynamos in synchronism at widely-separated points. Such a case arises in the multiplex transmission of telegraphic messages through central stations located at the ends of duplex lines employing alternating currents. Such an application of the invention is shown in Fig. 5. The connections for synchronizing the dynamo A' are exactly the same as shown in Fig. 3, the line L' being simply a duplex line and the relays 3 3' therefore neutral to the effects of the dynamo at their respective ends of the line.

Any suitable means may be employed for driving the dynamo A' at approximately constant speed. For example, a direct-current motor F may be coupled directly to the shaft of the dynamo, as shown in Fig. 6.

In addition to the arrangement shown for synchronizing the dynamo its motion may be further steadied by the employment of a mercury-damper, such as indicated by G in Fig. 7. This damper simply consists of a flywheel with a hollow rim, in which is carried mercury or other suitable liquid, which by its viscosity tends to deaden or damp any oscillatory vibrations from a uniform motion. This damper, however, forms no essential part of the present invention and may or may not be used as occasion may demand.

From the foregoing description it will be readily seen that this invention is not confined to the synchronism of dynamo-electric machines alone, but to any moving bodies which may be synchronized after the manner herein shown and for any purposes for which this synchronous motion may be useful or available. Inasmuch as the synchronism depends upon a retarding effect produced in one case by the absorption of electrical energy it is quite immaterial, so far as the principle of this invention is concerned, whether the coils that absorb this energy are mounted on a dynamo-armature, motor-armature, or any other device by which the coils may be made to absorb energy, and thereby do work and exert the requisite retarding effect. Moreover, in the case of a dynamo driven by an electric motor, as herein shown, we have an example of the application of the invention to synchronizing both dynamo and motor simultaneously, since, as they are direct-coupled, the synchronism of one is necessarily imparted to the other.

Having thus described this invention, what is claimed, and desired to be secured by Letters Patent of the United States, is—

1. In a synchronous system, the combination with a dynamo-electric machine, of a body with which said dynamo is to be synchronized, a circuit-changer controlled by the said dynamo, and a circuit-changer controlled by said body, an electric circuit completed from the armature-coils of said dynamo through both of said circuit-changers at rapidly-recurring intervals, electric-energy-absorbing means included in said circuit and exerting a continuous synchronizing effect upon said dynamo, by varying the energy absorbed by said dynamo with every variation in the speed of the body with which synchronism is to be maintained.

2. In a synchronous system, the combination with a dynamo-electric machine, of a body with which said dynamo is to be synchronized, a circuit-changer controlled by the said dynamo, and a circuit-changer controlled by the said body, an electric circuit completed from the armature-coils of said dynamo through both of said circuit-changers at rapidly-recurring intervals, electric-energy-absorbing means included in said circuit and exerting a continuous synchronizing effect upon said dynamo, by varying the energy absorbed by said dynamo with every variation in the speed of the body with which synchronism is to be maintained, said synchronizing effect being independent of the polarity of the current in the energy-absorbing circuit.

3. In a synchronous system, the combination with the dynamo-electric machine, of a body with which said dynamo is to be synchronized, said dynamo having a normal tendency to accelerate its speed relative to that of said body, a circuit-changer controlled by the said dynamo, and a circuit-changer controlled by the said body, an electric circuit completed from the armature-coils by and through both of said circuit-changers at rapidly-recurring intervals, electric-energy-absorbing means included in said circuit, and exerting a continuous synchronizing effect by varying the energy absorbed by said dynamo with every variation in the speed of the body with which synchronism is to be maintained.

4. In a synchronous system, the combination with an electric dynamo or motor and a body with which said dynamo is to be synchronized, of means for exerting a continuous regulating effect upon said dynamo or motor, said effect being the integral effect of a series of rapidly-recurring loads thrown upon said dynamo or motor, the duration of each of said loads varying with every change of speed of the said body with which the dynamo or motor is being synchronized.

5. In a synchronizing system, the combination with an electric dynamo or motor and a body with which said dynamo or motor is to be synchronized, of means for exerting a continuous regulating effect upon said dynamo or motor, said effect being the integral effect of a series of rapidly-recurring loads thrown upon said dynamo or motor, the duration of each of said loads varying with every change of speed of the said body with which the dynamo or motor is being synchronized, said regulating effect being independent of the polarity of the current in either of the elements of the said dynamo or motor.

6. In a synchronous system, the combination with a body with which synchronism is to be maintained and an electric dynamo or motor to be synchronized, of a set of regulating-coils carried by said dynamo or motor, electrical-energy-absorbing means, an electric circuit including said energy-absorbing means, and the regulating-coils of said dynamo or motor, circuit-changing devices for continuously connecting said energy-absorbing means in circuit with said regulating-coils and disconnecting the same therefrom at rapidly-recurring intervals, the duration of said intervals changing as the said dynamo or motor varies its phase with respect to the body with which synchronism is to be maintained.

7. In a synchronous system, the combination with a body with which synchronism is to be maintained and an electric dynamo or motor to be synchronized, regulating-coils carried by said dynamo or motor, and continuously-acting automatic means for throwing an intermittent load upon the coils of said dynamo or motor, said load varying with every change in speed of the said body with which synchronism is to be maintained.

8. In a synchronous system, the combination with a body with which synchronism is to be maintained and an electric dynamo or motor to be synchronized, said dynamo or motor having a normal tendency to accelerate its speed relative to said body, electrical-energy-absorbing means adapted to exert a retarding effect on the speed of said dynamo or motor independent of the polarity of the current therethrough, and means for connecting said energy-absorbing means into the circuit of said dynamo or motor, and disconnecting the same therefrom at intervals varying in duration with the change of phase between the dynamo or motor and said body.

9. In a synchronous system, the following instrumentalities, viz., a body with which synchronism is to be maintained and a body to be synchronized, a moving contact-maker governed by the first-named body, and a moving contact-maker governed by the body to be synchronized, an electric circuit including both of said contact-makers, electrical-energy-absorbing means adapted to be connected in circuit with both of said contact-makers, and disconnected therefrom intermittently, and to accelerate a retarding effect upon the body to be synchronized independent of the polarity of the current in said circuit, said retarding effect being the continuous integral result of a series of rapidly-recurring loads thrown upon said body to be synchronized by said energy-absorbing means, the time for which said loads are on said body varying as the difference in phase between the two bodies varies.

10. In a synchronous system, the combination with a controlling line-circuit carrying a periodically-varying electric current, a moving contact-maker controlled by the current in said circuit, an electric dynamo or motor to be synchronized, a moving contact-maker controlled by said dynamo or motor, and an electric circuit including both of said contact-makers and the armature of said dynamo or motor, an electric-energy-absorbing means adapted to be connected in said circuit through the instrumentality of said contact-makers at regular and rapidly-recurring intervals, the duration of said intervals varying as the said dynamo or motor varies its phase with respect to the body with which synchronism is to be maintained.

11. In a synchronous system, the combination with a controlling line-circuit, of a dynamo-electric machine delivering a periodically-varying current thereto, a moving contact-maker controlled by the current in said circuit, a dynamo-electric machine to be synchronized, a moving contact-maker controlled thereby, electrical resistance connected to the armature of said last-named dynamo, and connected in circuit therewith and with both of said contact-makers and disconnected therefrom at regular intervals, the said intervals varying in duration with the change of phase between said dynamos, and exerting a continuous synchronizing effect upon the dynamo to be synchronized, independent of the polarity of the current in either of the elements of said dynamo.

12. In a synchronous system, the following instrumentalities, viz., a line carrying a controlling electric current, a synchronous motor governed by the said controlling-current, a moving contact-maker controlled by the said synchronous motor, a dynamo-electric machine or motor to be synchronized, a moving contact-maker controlled by said dynamo or motor, said dynamo or motor having a tendency to accelerate its speed with relation to the said synchronous motor, and means for retarding said acceleration, said means being electrical resistance connected in the circuit of said dynamo or motor at intervals varying in duration as the phase between the said motor or dynamo and said synchronous motor varies.

In testimony whereof I affix my signature in the presence of two witnesses.

HENRIETTA H. ROWLAND,
*Administratrix of the estate of Henry Augustus Rowland, deceased.*

Witnesses:
COLUMBUS O'D. LEE,
D. N. SILLS.